(No Model.)
E. R. McCALL.
PREPARING GAS FOR PRESERVING FOOD.
No. 252,787. Patented Jan. 24, 1882.
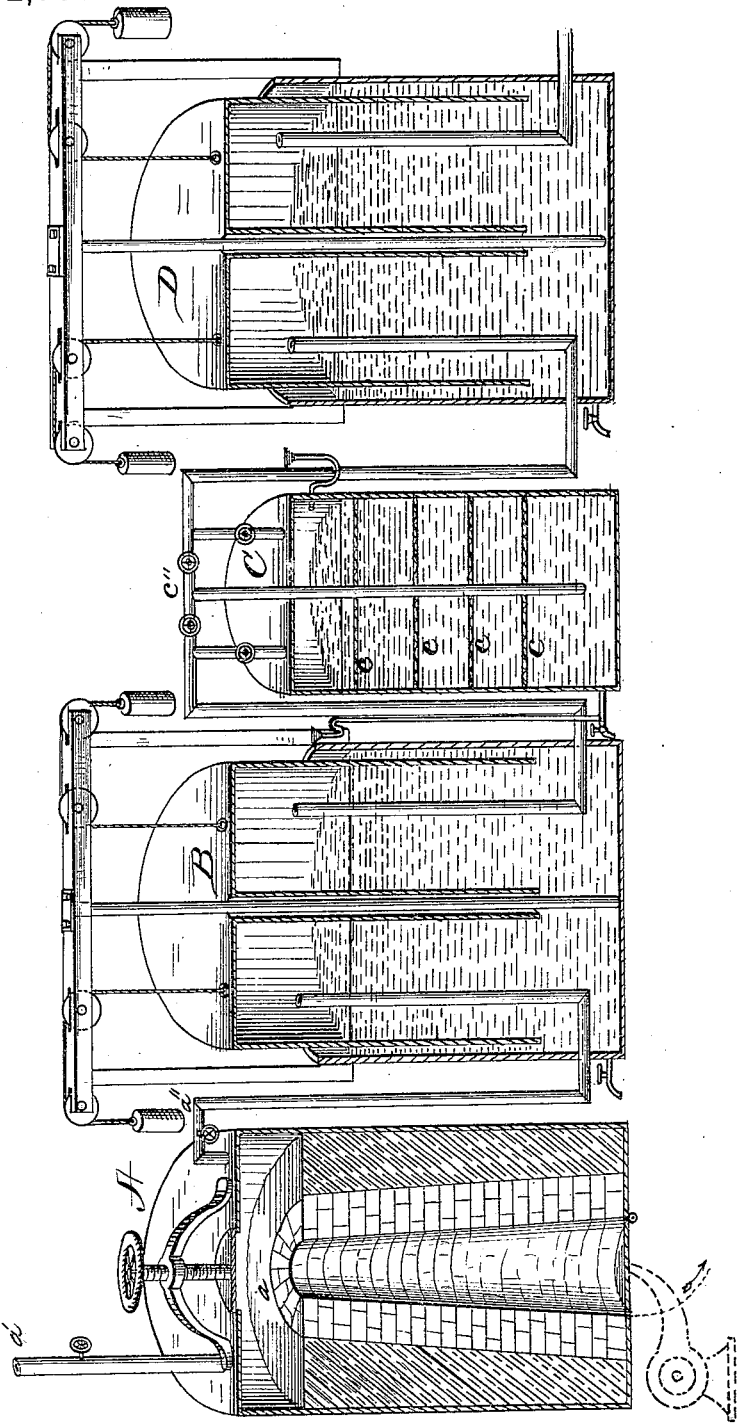
Witnesses,
F. L. Durand,
Lincoln Burket
Inventor,
Edwin R. McCall
by his attorney
Y. Hall Heness

United States Patent Office.

EDWIN R. McCALL, OF LOCKPORT, NEW YORK.

PREPARING GAS FOR PRESERVING FOOD.

SPECIFICATION forming part of Letters Patent No. 252,787, dated January 24, 1882.

Application filed December 24, 1881. (No model.)

*To all whom it may concern:*

Be it known that I, EDWIN R. MCCALL, of Lockport, Niagara county, State of New York, have invented an Improvement in Means for Preserving Food; and I do hereby declare the following is a full, clear, and exact description of the same.

A represents a vertical longitudinal section of the retort or furnace; B, the receiving and exhaust gasometer; C, a cylindrical purifier; D, a storage and controlling gasometer, the latter acting as a means for returning the gas through purifier to the gasometer first named. These are connected by suitable pipes having controlling cocks or valves.

This improvement relates to a novel means for rapidly generating and purifying, to any desired degree, gas or gases to be applied to the preservation of foods and other organic substances.

A represents a cylindrical furnace, having inner wall, $a$, which extends nearly to the top, and is composed of fire-brick. Between this and the outer casing is a filling composed of any refractory material which will serve as a non-conductor of heat. This furnace has at its top a man-hole closed by an ordinary retort-cover, which, when in use, is securely clamped thereon. At the foot of this furnace is an air-inlet pipe connected with blast-fan. An iron door falling downward serves to remove cinders and ashes. A pipe, $a'$, serves as an exit or waste pipe.

$a''$ is the conveying-pipe, opening into gasometer B, and is provided with a cock for restraining the gas until in proper condition.

Gasometer B is of the ordinary construction, except that it is provided with means for increasing and decreasing pressure upon the gasometer.

The purifier C may be cylindrical or square in form. It is connected with gasometer B by three pipes, which enter at the top, the center one of which, $c''$, reaches nearly to the bottom. It is provided also with wire-gauze diaphragms $c$. When in use it is filled with milk of lime or any suitable liquid purifying substance known to science which will serve as a purifying agent.

Gasometer D is of similar construction to the receiving-gasometer B, and is connected with preserving-chambers by a suitable pipe or pipes.

When in use the furnace is filled with coke, and the fire being lighted, a blast is turned on. The green gas is at first allowed to escape. The escape-pipe is then closed, blast continued, and the gases caused to pass into the receiving-gasometer. They may here be stored. A suction is caused upon the furnace by traction applied to the top of this gasometer. From this chamber the gas passes either directly to gasometer D or through the purifier, at will of the operator. When desired in large quantities it may be caused to pass through the purifier to gasometer D and directly to the preserving-chambers.

By closing communication with the furnace and applying pressure to gasometer D the gas may be returned through the purifier to the first gasometer, and this operation is repeated until the gas is of desired purity. To effect this four cocks are placed in the pipes at the top of the purifier. The central pipe is of sufficient length to cause energetic agitation of the milk of lime or other purifying agent and obviate any tendency to settle, and thus efficiently separate the impurities.

I am aware that it is not new to place a retort in direct connection with a gasometer containing water through which the entering gas is caused to pass, and also that it is not new to wash illuminating-gas with lime-water.

Having thus described my invention, what I claim, and desire to secure by Letters Patent, is—

1. The furnace A, in combination with receiving and exhaust gasometer B and purifier C, provided with perforated diaphragms $c$ and central inlet-pipe, as specified.

2. The combination consisting of gasometers B D with purifier C, located between the two, the latter serving for repeated passage of the gas and its efficient purification, as set forth.

3. The combination of furnace A, gasometer B, and purifier C, having the central dip-pipe and diaphragms stated, with gasometer D, in the order and for the purposes hereinbefore set forth.

In witness whereof I have hereunto signed my name in the presence of two witnesses.

EDWIN R. McCALL.

Witnesses:
T. HALL HENESS,
SAML. T. DRURY.